United States Patent
Kawai et al.

(10) Patent No.: US 6,668,224 B2
(45) Date of Patent: Dec. 23, 2003

(54) CONTROL APPARATUS AND METHOD FOR VEHICLE EQUIPPED WITH INTERNAL COMBUSTION ENGINE

(75) Inventors: Takashi Kawai, Susono (JP); Hiroshi Tsujii, Mishima (JP); Ken Kuretake, Mishima (JP); Masanori Sugiura, Toyota (JP); Hideto Hanada, Yokohama (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/201,723

(22) Filed: Jul. 24, 2002

(65) Prior Publication Data

US 2003/0033068 A1 Feb. 13, 2003

(30) Foreign Application Priority Data

Aug. 7, 2001 (JP) ........................................ 2001-239842

(51) Int. Cl.⁷ ............................ G06F 19/00; F02D 11/10
(52) U.S. Cl. ............................ 701/54; 701/67; 701/84; 701/101
(58) Field of Search ............................ 701/54, 67, 68, 701/84, 90, 101, 102, 110; 192/3.28, 3.31; 477/175, 169; 123/399, 435

(56) References Cited

U.S. PATENT DOCUMENTS 5,586,953 A * 12/1996 Abo ............................ 477/47
6,517,464 B2 * 2/2003 Yamazaki et al. ............ 477/5

FOREIGN PATENT DOCUMENTS

| JP | A 3-204470 | 9/1991 |
| JP | A 8-135778 | 5/1996 |
| JP | A 2001-146926 | 5/2001 |

* cited by examiner

Primary Examiner—Tan Q. Nguyen
(74) Attorney, Agent, or Firm—Oliff & Berridge, PLC

(57) ABSTRACT

A vehicle includes an internal combustion engine that is variably connected, for example, via a mechanical clutch, to a drive train including a transmission. The vehicle also has a functional device operated by a torque generated by the internal combustion engine. A load applied by the functional device on the internal combustion engine when the drive train and the engine are engaged during deceleration of the vehicle and a speed of the internal combustion engine is lower than a predetermined value is controlled such that the load is reduced to a first value lower than a second value of the load applied to the engine when the speed of the internal combustion engine is equal to or higher than the predetermined value.

32 Claims, 2 Drawing Sheets

5 : LOCKUP CLUTCH
7 : ALTERNATOR
11 : ACCUMULATOR TANK
13 : CAPACITOR

6 : AIR-CONDITIONING COMPRESSOR
8 : AIR-CONDITIONER CLUTCH
12 : BATTERY
16 : CONTROLLER

CONTROL APPARATUS AND METHOD FOR VEHICLE EQUIPPED WITH INTERNAL COMBUSTION ENGINE

INCORPORATION BY REFERENCE

The disclosure of Japanese Patent Application No. 2001-239842 filed on Aug. 7, 2001, including the specification, drawings and abstract is incorporated herein by reference in its entirety.

BACKGROUND OF THE INVENTION

1. Field of Invention

The invention relates to a control apparatus and method for a vehicle which has an internal combustion engine such as, for example, a gasoline engine or a diesel engine connected on its output side via a mechanical clutch to a drive train including a transmission and which is equipped with functional devices such as accessories operating on the basis of a torque transmitted from the internal combustion engine.

2. Description of Related Art

As is well known, there have been earnest demands for an improvement of fuel consumption in vehicles. To improve fuel consumption in a vehicle employing an internal combustion engine as a power source, it is desirable that the internal combustion engine be always operated with high efficiency. While power generated by the internal combustion engine is used to cause the vehicle to run, it is also used as power for driving accessories such as, for example, a generator and an air-conditioner. Therefore, it is desirable to operate the internal combustion engine in such a manner as to satisfy requirements regarding a running state of the vehicle and the accessories.

In view of these circumstances, for example, according to JP-A-8-135778, a true value of running load is calculated by subtracting a correction amount corresponding to loads of accessories such as an air-conditioner and an alternator from a depression stroke of an accelerator pedal indicating a required drive amount for causing a vehicle to run, and a timing for making a gear shift or engaging a lockup clutch is determined on the basis of the corrected running load. The aforementioned technology ensures that a timing for upshift or lockup does not shift to the side of higher speeds, and thus makes it possible to improve fuel consumption or emission properties.

The aforementioned technology is designed to prevent an engine from being operated at an unnecessarily high speed when the vehicle runs on the basis of an output from the engine. On the other hand, a so-called fuel-cut operation is known as a technique for improving fuel consumption in a vehicle employing an internal combustion engine as a power source. When the internal combustion engine runs at a speed equal to or higher than a predetermined speed during slowdown of the vehicle, the fuel-cut operation is performed by stopping supply of fuel to the engine on the condition that an accelerator pedal is released completely.

The fuel-cut operation as mentioned herein can be performed at a speed equal to or higher than a speed at which the internal combustion engine can start running autonomously again in response to resumption of the supply of fuel. Hence, if the vehicle is equipped with the aforementioned lockup clutch, the lockup clutch remains engaged so that the speed of the internal combustion engine is increased to the highest possible speed by an inertia force applied to the vehicle in a running state. On the other hand, the lockup clutch mechanically and directly couples the internal combustion engine with the drive train including the transmission connected to the output side of the internal combustion engine. If the lockup clutch is engaged, namely, if the lockup clutch is in a lockup state, oscillation of the internal combustion engine is likely to be transmitted to a body of the vehicle via the drive train. Low-frequency oscillation is sensed as a booming noise or the like and thus constitutes a factor causing deterioration in driving comfort. For this reason, the control according to this technology is designed such that the lockup clutch that is engaged during slowdown of the vehicle is released if the engine speed falls to a predetermined speed, and thereby prevents oscillation of the internal combustion engine from being transmitted to the vehicle body. In this case, since the speed of the internal combustion engine falls because of release of the lockup clutch, the fuel-cut operation is stopped and the supply of fuel to the internal combustion engine is resumed.

As described above, the lockup clutch is released during slowdown of the vehicle as a countermeasure against deterioration in driving comfort resulting from oscillation. On the other hand, if the internal combustion engine drives accessories such as an air-conditioner and an alternator, the load applied to the internal combustion engine has been increased by an amount corresponding to loads caused by the accessories. Therefore, the internal combustion engine oscillates more violently, and oscillation or booming noise resulting therefrom tends to cause deterioration in driving comfort. That is, if the internal combustion engine drives the accessories, oscillation of the internal combustion engine tends to occur due to an increased load. As a result, it is desirable to release the lockup clutch when the internal combustion engine runs at a relatively high speed. In other words, a disadvantage arises in improving fuel consumption.

There is no technology that attempts to tackle this problem. Although the aforementioned publication refers to technical details about the timing for lockup, the timing for releasing the lockup clutch is not addressed.

SUMMARY OF THE INVENTION

It is one object of the invention to provide a control apparatus and method capable of improving fuel consumption in a vehicle equipped with an internal combustion engine.

To achieve the above and/or other objects, the control apparatus and method according to one aspect of the invention reduces loads resulting from functional devices such as accessories operated by power transmitted from an internal combustion engine when a vehicle slows down with the internal combustion engine mechanically coupled on its output side to a drive train by means of a clutch so as to reduce a load applied to the internal combustion engine. The internal combustion engine typically is connected via a mechanical clutch to a drive train including a transmission. The vehicle includes one or more functional device(s) operated by a torque generated by the internal combustion engine. The control apparatus and method controls a load applied by the functional device on the internal combustion engine when the mechanical clutch is in an engaged state during deceleration of the vehicle and a speed of the internal combustion engine is lower than a predetermined value such that the load is reduced to a first value lower than a second value of the load applied to the engine when the speed of the internal combustion engine is equal to or higher than the predetermined value.

According to the aforementioned aspect, the mechanical clutch directly couples the internal combustion engine and the drive train with each other when the vehicle slows down, and the internal combustion engine drives the functional devices while this state is maintained. If the speed of the internal combustion engine gradually falls during slowdown of the vehicle and then becomes equal to or lower than a predetermined speed, loads applied to the internal combustion engine by the functional devices are made lower than the load applied before. The load applied to the internal combustion engine is reduced, and oscillation generated in the internal combustion engine is suppressed. Even if the mechanical clutch remains engaged, factors causing deterioration in driving comfort such as booming noise hardly arise. Thus, the mechanical clutch can be left engaged until the speed of the internal combustion engine reaches a relatively low speed. In other words, the period in which the mechanical clutch is engaged to maintain the speed of the internal combustion engine at or above a speed corresponding to resumption of the supply of fuel can be extended. Accordingly, it becomes possible to achieve improvement in fuel consumption.

According to another aspect of the invention, a function compensating device can be provided to compensate for a functional deterioration caused by reduction of the load of the functional device on the internal combustion engine.

According to the aforementioned aspect, if the load(s) applied to the internal combustion engine by the functional device(s) is/are reduced, namely, if the operational state(s) of the functional device(s) deteriorate, the function compensating device compensates for a loss in the functions of the functional devices. Therefore, the vehicle can be maintained in the same operational or running state as before.

According to another aspect of the invention, when the functional deterioration of the functional device is not compensated for by the function compensating device, the speed of the internal combustion engine at which a torque capacity of the mechanical clutch is reduced can be set to a third value higher than the first value that is set when the functional deterioration is compensated for by the function compensating device.

According to this aspect of the invention, if the function compensating device cannot compensate for a loss in the functions of the functional device(s), the speed corresponding to reduction of the torque capacity of the mechanical clutch becomes higher during slowdown of the vehicle. In the case where the mechanical clutch is engaged to increase the speed of the internal combustion engine and where the supply of fuel to the internal combustion engine is stopped as a result, the supply of fuel is resumed when the internal combustion engine runs at a relatively high speed. Consequently, the internal combustion engine runs autonomously, and the functional device(s) is/are driven by the output from the internal combustion engine, whereby the functional devices are guaranteed to operate properly. Therefore, the vehicle is maintained in the same operational or running state as before.

BRIEF DESCRIPTION OF THE DRAWINGS

The invention will be described with reference to the following drawings which illustrate an exemplary embodiment, and wherein.

DETAILED DESCRIPTION OF EXEMPLARY EMBODIMENTS

Figure 2:
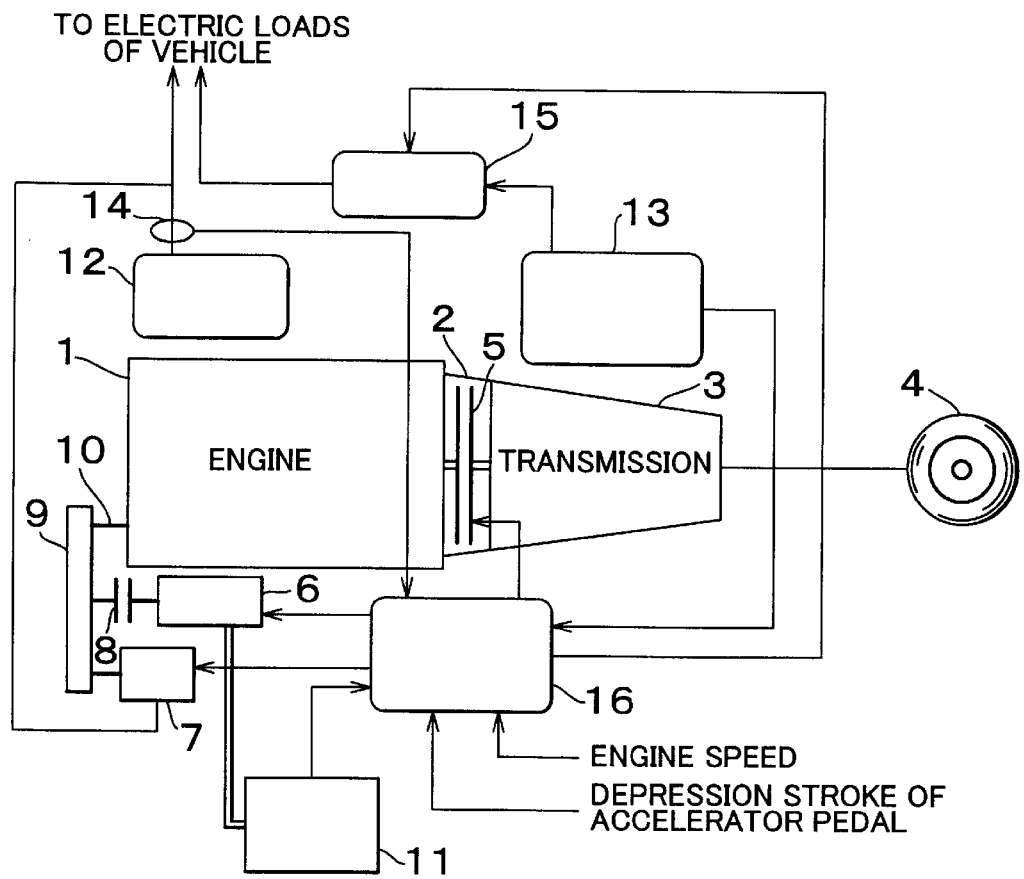
FIG. 2 is a schematic block diagram of an exemplary power train for a vehicle to which the invention can be applied.

The invention will now be described with reference to an exemplary embodiment. First of all, an exemplary vehicle equipped with a control apparatus according to the invention will be described briefly. Referring to FIG. 2, a transmission 3 is connected to output side of an internal combustion engine (engine) 1 via a torque converter 2. The engine 1 functions as a power source. A torque output from the transmission 3 is transmitted to a driving wheel 4, whereby it becomes possible to drive the vehicle. A torque transmission system extending from the torque converter 2 to the driving wheel 4 constitutes a drive train.

The engine 1 is a power unit in which fuel is burnt to output power, and can be, for example, a gasoline engine or a diesel engine. The engine 1 is designed to be capable of electronically controlling throttle opening, fuel injection amount, ignition timing, or the like. For example, while the vehicle runs with a throttle fully closed, the supply of fuel is stopped if the engine 1 runs at a speed equal to or higher than a predetermined speed. That is, so-called fuel cut operation is performed.

In summary, the torque converter 2 is a hydraulic power transmission for transmitting a torque via fluid. The torque converter 2 includes an input-side member (e.g., a pump impeller) and an output-side member (e.g., a turbine runner), and is equipped with a lockup clutch 5 for mechanically and directly coupling the input-side member and the output-side member with each other. The lockup clutch 5 is one example of a mechanical clutch.

In summary, the transmission 3 is a unit capable of suitably changing a ratio of input speed to output speed, namely, a speed ratio. Any transmission of a suitable type can be employed as the transmission 3. For example, the transmission 3 may be a multi-stage transmission or a continuously variable transmission and may be an automatic transmission or a manual transmission. In the example shown in FIG. 2, an automatic transmission is employed as the transmission 3.

Various functional devices driven by a torque generated by the engine 1 are connected to the engine 1. The functional devices include, for example, accessories such as an air-conditioning compressor 6 and an alternator 7. The air-conditioning compressor 6 is equipped with an air-conditioner clutch 8 that is electrically controlled to be engaged or released (controlled in an on-off manner). The air-conditioner clutch 8 is connected to an accessory output shaft 10 of the engine 1 via a driving mechanism 9 such as a belt, whereby the air-conditioning compressor 6 can be directly connected to the engine 1.

The air-conditioning compressor 6 is connected to an accumulator tank 11 for accumulating coldness (e.g., by either collecting cold air or more preferably by cooling a coolant). For example, the accumulator tank 11 can use a coolant or a suitable material that has been cooled by the coolant to accumulate coldness. That is, the air-conditioning compressor 6 has a function of supplying the accumulator tank 11 with coldness and accumulating it, as well as a function of cooling air to be introduced into a passenger compartment of the vehicle (not shown). The accumulator tank 11 can supply coldness in place of the air-conditioning compressor 6 and thus constitutes one example of a function compensating device.

The alternator 7 is connected to the accessory output shaft 10 via the driving mechanism 9. The alternator is connected to electric components (not shown). The alternator 7 is also connected to an accumulator unit. In the example shown in FIG. 2, a battery 12 and a capacitor 13 are provided as the accumulator unit. The battery 12 and the capacitor 13 are designed to supply power in cooperation with or in place of the alternator 7, and constitute one example of a function compensating device. It is also possible to provide a second battery (e.g., a 36V-battery) instead of the capacitor 13, or to only provide a single battery or a single capacitor, for example.

A current sensor 14 for detecting output current is connected to the battery 12. A DC/DC converter 15, via which power is output to a predetermined one of the electric components, is connected to the capacitor 13. The capacitor 13 may also be designed to store power generated by a regenerative generator (not shown), which can be, for example, a motor/generator of a hybrid-electric vehicle.

The vehicle is equipped with a controller 16 mainly composed of a microcomputer. The controller 16 receives data for performing control, for example, engine speed, accelerator opening amount (depression stroke of an accelerator pedal (not shown)), amount of coldness accumulated in the accumulator tank 11, amount of electric charge stored in the capacitor 13, amount of current detected by the current sensor 14, and the like. As control signals for the components, the controller 16 outputs a signal indicating release or engagement (including a slip state) of the lockup clutch 5 (a signal indicating an on-off state of the lockup clutch 5), a signal indicating an on-off state of the air-conditioning compressor 6 (more specifically, a signal indicating an on-off state of the air-conditioner clutch 8), a signal indicating an on-off state of the alternator 7, an output control signal for the DC/DC converter 15, and the like.

The following description relates to control of the vehicle equipped with the aforementioned power train, more specifically, control of the engine 1, the lockup clutch 5, and accessories. As described above, the engine 1 shown in FIG. 2 is designed to perform a fuel-cut operation. If the throttle is fully closed (or if the accelerator pedal is released) during running of the vehicle, the supply of fuel is stopped on the condition that an engine speed at that moment is equal to or higher than a predetermined lower-limit speed (i.e., a fuel-cut recovery speed).

While the vehicle slows down, a torque based on an inertia force applied to the vehicle is supplied from the side of the driving wheel 4 to the engine 1, whereby it becomes possible to maintain the engine speed at a speed corresponding to a vehicle speed and make engine braking effective. Lockup control is hence performed to engage the lockup clutch 5 during slowdown of the vehicle. On the other hand, if the lockup clutch 5 is engaged, oscillation of the engine 1 is likely to be transmitted to a body of the vehicle. Thus, when the engine 1 runs at a low speed equal to or lower than a predetermined speed at which low-frequency oscillation sensed as so-called booming noise is generated, the lockup clutch 5 is released so as to prevent deterioration in driving comfort.

If the lockup clutch 5 is engaged while the vehicle slows down, the engine speed can be maintained at a relatively high speed due to an inertia force applied to the vehicle. Therefore, it is easy to continue to perform the fuel-cut operation. However, if the lockup clutch 5 is released, because the throttle is fully closed, the engine speed falls to the fuel-cut recovery speed and the supply of fuel is resumed. Accordingly, in order to improve fuel consumption, it is preferable that the performance of the fuel-cut operation be continued as long as possible. To accomplish this purpose, it is preferred that the lockup clutch 5 remain engaged as long as possible during slowdown of the vehicle, that is, until the engine speed reaches a low speed.

The control apparatus according to an aspect of the invention is designed to perform control as described below, so as to make a period of engagement of the lockup clutch 5 as long as possible to such an extent that the vehicle can run or operate without problems and that driving comfort is not adversely affected, and so as to improve fuel consumption.

Figure 1:
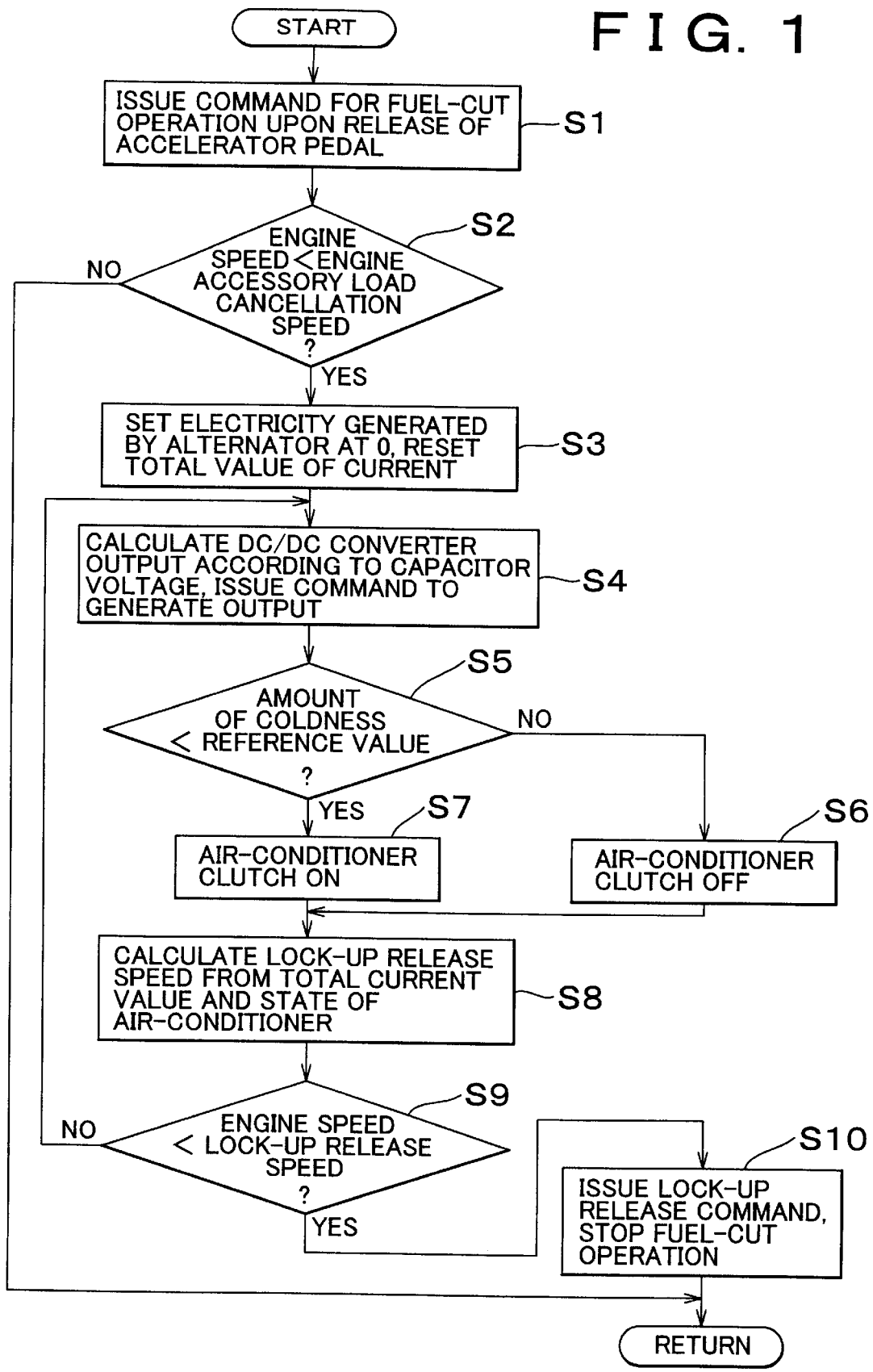
FIG. 1 is a flowchart of an example of a control routine performed by a control apparatus according to an exemplary embodiment of the invention.

FIG. 1 is a simplified flowchart for explaining an example of such control. A routine shown herein is repeatedly executed at a predetermined interval ($\Delta t$ seconds). The control routine shown in FIG. 1 is performed when the accelerator pedal (not shown) is released while the vehicle runs at a moderate speed and the vehicle then starts slowing down. By fully releasing the accelerator pedal, a command signal for fuel-cut operation is issued in step S1. In this case, the lockup clutch 5 is engaged, and the engine speed has increased to a speed equal to or higher than the fuel-cut recovery speed. While this state is maintained, in step S2, it is determined whether the engine speed is lower than an engine accessory load cancellation speed.

The engine accessory load cancellation speed is determined in advance as a speed at which booming noise or the like causes deterioration in driving comfort as a result of loads applied to the engine 1 by accessories. In other words, while the engine 1 runs at this speed, the lockup clutch 5 can be held engaged if the loads applied to the engine 1 by the accessories are cancelled or reduced. Thus, if NO is obtained in step S2 on the ground that the engine speed is equal to or higher than the engine accessory load cancellation speed, there is no need to cancel or reduce the loads resulting from the accessories. Therefore, the control operation returns to the entry of the routine so as to maintain a previous state.

On the other hand, if YES is obtained in step S2 on the ground that the engine speed has become lower than the engine accessory load cancellation speed, the process proceeds to step S3 in which the amount of power generated by the alternator 7 is set as zero. That is, loads applied to the engine 1 by the functional devices are reduced. At the same time, the cumulative value of current detected by the current sensor 14 is reset to zero, so as to cumulate values of current generated by the battery 12 again.

An output from the DC/DC converter 15 is calculated in accordance with a voltage (stored amount of electric charge), and a command to generate the output is carried out in step S4. In this manner, the battery 12 and the capacitor 13 supply electricity to the vehicle, in place of the alternator 7. That is, the battery 12 and the capacitor 13 function as a function compensating device. Furthermore, the amount of electric charge stored in the capacitor can be increased by operating the regenerative generator (not shown) if available.

The process proceeds to step S5 in which it is determined whether the amount of coldness stored in the accumulator tank is smaller than a reference amount. The reference amount may be either a predetermined constant value or a variable depending on a required cooling amount that is determined in a real-time manner by an outside temperature, an amount of solar radiation, or the like.

If NO is obtained in step S5, it follows that the amount of coldness stored in the accumulator tank 11 is equal to or greater than the reference amount and that the amount of coldness stored in the accumulator tank 11 is more than sufficient. The process then proceeds to step S6 in which the air-conditioner clutch 8 is controlled to be turned off (to be released). The amount of coldness stored in the accumulator tank 11 compensates for a functional loss resulting from stoppage of the air-conditioning compressor 6, that is, a work to be delivered by the air-conditioning compressor 6. Thus, the accumulator tank 11 functions as a function compensating device.

On the other hand, if YES is obtained in step S5, the amount of coldness stored in the accumulator tank 11 is insufficient, it is impossible (or undesirable) to provide coldness for air conditioning in place of the air-conditioning compressor 6. Thus, the air-conditioner clutch 8 is turned on (engaged), and the air-conditioning compressor 6 is driven by the engine 1 in step S7.

Because of the control performed hitherto, the load applied to the engine 1 by the alternator 7 is cancelled when the engine speed is lower than the engine accessory load cancellation speed, whereas the load applied to the engine 1 by the air-conditioning compressor 6 is either cancelled or left as it is. Thus, a speed at which the lockup clutch 5 is released in accordance with operational states of these so-called functional devices and an operational state of the function compensating device (i.e., a lockup release speed) is calculated in step S8. More specifically, an amount of electricity remaining in the battery 12 is calculated from a cumulative value of current detected by the current sensor 14, and it is determined on the basis of an on-off state of the air-conditioner clutch 8 whether there is a load resulting from the air-conditioning compressor 6. A lockup release speed is then calculated on the basis of the results of these calculations and determinations. Calculation of a lockup release speed can be made, for example, using a map that is prepared and stored in advance.

The lockup release speed is set so as to satisfy one or more requirements such as, for example, a requirement for maintaining normal operation of the vehicle, a requirement for improving fuel consumption, a requirement for ensuring driving comfort, and the like. As an example, if the cumulative value of current detected by the current sensor 14 is great, the lockup release speed is set as a relatively high speed so as to prevent overdischarge of the battery 12. Further, if the air-conditioner clutch 8 has been turned off, no load is applied to the engine 1 by the air-conditioning compressor 6. Booming noise is thus unlikely to be produced even if the engine runs at a low speed. Therefore, the lockup release speed is set as a relatively low speed. On the contrary, if the air-conditioner clutch 8 has been turned on, a load is applied to the engine 1 by the air-conditioning compressor 6. Thus, if the engine runs at a low speed, a factor causing deterioration in driving comfort, such as booming noise, is likely to be produced. Therefore, the lockup release speed is set as a relatively high speed.

Then in step S9, an engine speed is compared with the lockup release speed thus set. If NO is obtained in step S9 on the ground that the engine speed is equal to or higher than the lockup release speed, the process returns to step S4 so as to perform the foregoing processing. On the other hand, if YES is obtained in step S9 on the ground that the engine speed is lower than the lockup release speed, a lockup release command is issued to release the lockup clutch 5 in step S10. Because the engine speed falls to the fuel-cut recovery speed in response to the lockup release command, a command to stop fuel-cut operation (OFF command) is generated. That is, the supply of fuel to the engine 1 is resumed, and the engine 1 runs autonomously. As a result, the alternator 7 is driven by the engine 1, and the battery 12 is charged with power generated by the alternator 7.

Thus, according to the control shown in FIG. 1, if the battery 12, the capacitor 13, or the accumulator tank 11 can perform the functions of the accessories such as the alternator 7 and the air-conditioning compressor 6 or compensate for losses in those functions, loads applied to the engine 1 by the accessories are reduced (or cancelled), and the lockup clutch 5 can be held engaged until the engine speed falls to a low speed. Therefore, the period in which the lockup clutch 5 is engaged to maintain the engine speed at a speed equal to or higher than the fuel-cut recovery speed is extended. As a result, it becomes possible to achieve an improvement in fuel consumption.

In this case, since the lockup release speed is set in accordance with loads caused by the accessories, deterioration in driving comfort resulting from booming noise or the like is prevented or inhibited. Further, since the lockup release speed is set in accordance with a state of the so-called function compensating device(s) such as the battery 12, it is possible to obviate abnormal events such as overdischarge of the battery 12 and maintain a good driving state or a good operational state of the vehicle.

The functions performed by execution of step S3 and step S6 as shown in FIG. 1 correspond to an example of load reduction. The function performed by execution of step 8 as shown in FIG. 1 corresponds to an example of clutch release speed setting.

The invention is not limited to the aforementioned example. Thus, it is not indispensable that the mechanical clutch be the lockup clutch built into the aforementioned hydraulic power transmission. That is, the mechanical clutch may also be a so-called starting clutch for selectively coupling an engine with a drive train such as a transmission. The control for reducing the torque capacity of the mechanical clutch is not always required to release the clutch completely and may be designed to maintain the clutch in a slip state. In short, the control can be designed in any manner so long as the torque to be transmitted is reduced. Although the accumulator tank ensures the function of the air-conditioning compressor in the aforementioned embodiment, it is also possible that an electric motor be provided separately instead of the accumulator tank and that the function of the compressor be compensated for by operating the compressor by means of the electric motor when the air-conditioner clutch 8 is turned off.

As described above, if the speed of the internal combustion engine gradually falls during slowdown of the vehicle and then becomes equal to or lower than a predetermined speed, loads applied to the internal combustion engine by the functional devices are made lower than before. Therefore, the load applied to the internal combustion engine is reduced, whereby oscillation generated in the internal combustion engine is suppressed. Also, even if the mechanical clutch remains engaged, factors causing a deterioration in driving comfort such as booming noise hardly arise. That is, the mechanical clutch can be held engaged until the speed of the internal combustion engine reaches a lower speed. As a result, the period in which the mechanical clutch is engaged to maintain the speed of the internal combustion engine at or above a speed corresponding to resumption of the supply of fuel can be extended. Accordingly, it becomes possible to achieve an improvement in fuel consumption.

If the loads applied to the internal combustion engine by the functional devices are reduced, namely, if the operational states of the functional devices deteriorate, the function compensating device can compensate for a loss in the functions of the functional devices. Therefore, the vehicle can be maintained in the same operational or running state as before. It is thus possible to obviate abnormal events regarding the running or driving condition of the vehicle.

Furthermore, if the function compensating device(s) cannot compensate for a loss in the functions of the functional devices, the speed corresponding to reduction of the torque capacity of the mechanical clutch becomes higher during slowdown of the vehicle. In the case where the mechanical clutch is engaged to increase the speed of the internal combustion engine and where the supply of fuel to the internal combustion engine is stopped as a result, the supply of fuel is resumed when the internal combustion engine runs at a relatively high speed. Consequently, the internal combustion engine runs autonomously, and the functional devices are driven by the output from the internal combustion engine, whereby the functional devices are guaranteed to operate properly. Therefore, the vehicle is maintained in the same operational or running state as before, whereby it becomes possible to obviate abnormal events regarding the running or driving condition of the vehicle.

In the illustrated embodiment, the apparatus is controlled by the controller 16, which is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to exemplary embodiments thereof, it is to be understood that the invention is not limited to the disclosed embodiments or constructions. To the contrary, the invention is intended to cover various modifications and equivalent arrangements. In addition, while the various elements of the embodiments are shown in various combinations and configurations, which are exemplary, other combinations and configurations, including more, less or a single element, are also within the spirit and scope of the invention.

What is claimed is:

1. A control apparatus for a vehicle having an internal combustion engine connected via a mechanical clutch to a drive train including a transmission, the vehicle having a functional device operated by a torque generated by the internal combustion engine, the control apparatus comprising a controller that:

controls a load applied by the functional device on the internal combustion engine when the mechanical clutch is in an engaged state during deceleration of the vehicle and a speed of the internal combustion engine is lower than a predetermined value such that the load is reduced to a first value lower than a second value of the load applied to the engine when the speed of the internal combustion engine is equal to or higher than the predetermined value.

2. A control apparatus according to claim 1, wherein the functional device comprises at least one of a compressor and an alternator.

3. A control apparatus according to claim 1, wherein the mechanical clutch comprises a lock-up clutch.

4. A control apparatus according to claim 1, further comprising a function compensating device that compensates for a functional deterioration in the function performed by the functional device caused by reduction of the load applied by functional device on the internal combustion engine.

5. A control apparatus according to claim 4, wherein the function compensating device comprises at least one of an accumulator tank, a battery and a capacitor provided in the vehicle.

6. A control apparatus according to claim 5, wherein the functional device includes an alternator, and at least one of the battery and the capacitor is operated to compensate for the functional deterioration caused by reduction of the load applied by the alternator on the internal combustion engine.

7. A control apparatus according to claim 5, wherein the controller causes a regenerative generator provided with the internal combustion engine to operate to supply electric power to the capacitor.

8. A control apparatus according to claim 5, wherein the functional device includes an alternator, and the battery is operated to compensate for the functional deterioration caused by reduction of the load applied by the alternator on the internal combustion engine.

9. A control apparatus according to claim 5, wherein the functional device includes a compressor, and the accumulator tank is operated to compensate for the functional deterioration caused by reduction of the load applied by the compressor on the internal combustion engine.

10. A control apparatus according to claim 5, wherein the functional device includes a compressor, and further comprising an electric motor that is operated to compensate for the functional deterioration caused by reduction of the load applied by the compressor on the internal combustion engine.

11. A control apparatus according to claim 4, wherein when the functional deterioration of the functional device is not compensated for by the function compensating device, the controller sets a speed of the internal combustion engine at which a torque capacity of the mechanical clutch is reduced to a third value higher than the first value that is set when the functional deterioration is compensated for by the function compensating device.

12. A control apparatus according to claim 11, wherein the mechanical clutch comprises a lock-up clutch.

13. A control apparatus according to claim 12, wherein the functional deterioration of the functional device is not compensated for by the function compensating device when the lock-up clutch is released.

14. A vehicle comprising:

an internal combustion engine that is variably connected to a drive train including a transmission;

an electrical device operated by a torque generated by the internal combustion engine; and a controller that controls a load applied by the electrical device on the internal combustion engine when the drive train is engaged with the internal combustion engine during deceleration of the vehicle and a speed of the internal combustion engine is lower than a predetermined value such that the load applied by the electrical device on the internal combustion engine is reduced to a first value lower than a second value of the load applied to the engine when the speed of the internal combustion engine is equal to or higher than the predetermined value.

15. A vehicle according to claim 14, wherein the electrical device comprises at least one of a compressor and an alternator.

16. A vehicle according to claim 14, further comprising a mechanical clutch that variably connects the internal combustion engine to the drive train.

17. A vehicle according to claim 14, further comprising an assist unit that assists the electrical device in order to compensate for a functional deterioration in the function performed by the electrical device caused by reduction of the load applied by electrical device on the internal combustion engine.

18. A vehicle according to claim 17, wherein the assist unit comprises at least one of an accumulator tank, a battery and a capacitor provided in the vehicle.

19. A vehicle according to claim 17, wherein when the functional deterioration of the electrical device is not compensated for by the assist unit, the controller sets a speed of the internal combustion engine at which an amount of engagement between the internal combustion engine and the drive train is reduced to a third value higher than the first value that is set when the functional deterioration is compensated for by the assist unit.

20. A control method for a vehicle having an internal combustion engine that is variably connected to a drive train including a transmission, the vehicle having a functional device operated by a torque generated by the internal combustion engine, the control method comprising:

controlling a load applied by the functional device on the internal combustion engine when the drive train and the engine are engage during deceleration of the vehicle and a speed of the internal combustion engine is lower than a predetermined value such that the load is reduced to a first value lower than a second value of the load applied to the engine when the speed of the internal combustion engine is equal to or higher than the predetermined value.

21. A control method according to claim 20, wherein the functional device comprises at least one of a compressor and an alternator.

22. A control method according to claim 20, wherein the drive train is variably connected to the engine by a lock-up clutch.

23. A control method according to claim 20, further comprising causing a function compensating device of the vehicle to compensate for a functional deterioration in the function performed by the functional device caused by reduction of the load applied by functional device on the internal combustion engine.

24. A control method according to claim 23, wherein the function compensating device comprises at least one of an accumulator tank, a battery and a capacitor provided in the vehicle.

25. A control method according to claim 24, wherein the functional device includes an alternator, and at least one of the battery and the capacitor is operated to compensate for the functional deterioration caused by reduction of the load applied by the alternator on the internal combustion engine.

26. A control method according to claim 24, further comprising causing a regenerative generator provided with the internal combustion engine to operate to supply electric power to the capacitor.

27. A control method according to claim 24, wherein the functional device includes an alternator, and the battery is operated to compensate for the functional deterioration caused by reduction of the load applied by the alternator on the internal combustion engine.

28. A control method according to claim 24, wherein the functional device includes a compressor, and the accumulator tank is operated to compensate for the functional deterioration caused by reduction of the load applied by the compressor on the internal combustion engine.

29. A control method according to claim 24, wherein the functional device includes a compressor, and further comprising operating an electric motor to compensate for the functional deterioration caused by reduction of the load applied by the compressor on the internal combustion engine.

30. A control method according to claim 23, wherein when the functional deterioration of the functional device is not compensated for by the function compensating device, the controlling step includes setting a speed of the internal combustion engine at which an amount of engagement between the drive train and the engine is reduced to a third value higher than the first value that is set when the functional deterioration is compensated for by the function compensating device.

31. A control method according to claim 30, wherein the engine is variably connected to the drive train by a lock-up clutch.

32. A control method according to claim 31, wherein the functional deterioration of the functional device is not compensated for by the function compensating device when the lock-up clutch is released.

* * * * *